United States Patent
Nakae et al.

(10) Patent No.: US 6,836,656 B2
(45) Date of Patent: Dec. 28, 2004

(54) PORTABLE TELEPHONE

(75) Inventors: Kazuaki Nakae, Higashiosaka (JP);
Makoto Kato, Higashiosaka (JP)

(73) Assignee: Sanyo Electric Co., Ltd., Osaka (JP)

( * ) Notice: Subject to any disclaimer, the term of this patent is extended or adjusted under 35 U.S.C. 154(b) by 717 days.

(21) Appl. No.: 09/833,568

(22) Filed: Apr. 13, 2001

(65) Prior Publication Data

US 2001/0031651 A1 Oct. 18, 2001

(30) Foreign Application Priority Data

Apr. 14, 2000 (JP) ........................................ 2000-113716

(51) Int. Cl.[7] .............................................. H04M 3/00
(52) U.S. Cl. .................... 455/418; 455/343.4; 455/567; 455/574
(58) Field of Search ................................ 455/418, 567, 455/566, 574, 343.4, 550.1; 340/7.32, 7.38, 7.39

(56) References Cited

U.S. PATENT DOCUMENTS

| | | | |
|---|---|---|---|
| 5,367,558 A | 11/1994 | Gillig et al. .................. 379/59 |
| 5,485,505 A | 1/1996 | Norman et al. ............... 379/58 |
| 6,317,593 B1 * | 11/2001 | Vossler .................... 455/414.1 |
| 2003/0032464 A1 * | 2/2003 | Sprigg et al. ............... 455/574 |

FOREIGN PATENT DOCUMENTS

| | | |
|---|---|---|
| JP | 5-327591 | 12/1993 |
| JP | 11-68648 | 3/1999 |

OTHER PUBLICATIONS

Sony Program Timer PT–D555ES Instruction Booklet, Sony Corporation, 1984.

* cited by examiner

*Primary Examiner*—Lee Nguyen
(74) *Attorney, Agent, or Firm*—Armstrong, Kratz, Quintos, Hanson & Brooks, LLP

(57) ABSTRACT

A portable telephone of the present invention comprises manual keys, a power-on time memory portion 4 for storing the power-on time being input by the manipulation of the key, a power-on time detection portion 5 for detecting whether the time stored in the power-on time memory portion 4 comes, a validation/invalidation memory portion 6 for storing the validation/invalidation of the automatic power-on function set input by the key manipulation, a main control portion 3 for turning on the power upon detecting the power-on time coming only when the validation of the automatic power-on function set is stored in the validation/invalidation memory portion 6. Accordingly, even if the user sets alarm for a plurality of times, the automatic power-on function can be cancelled by the simple manipulation, and the setting of the automatic power-on function can be returned to the original state by the simple manipulation.

4 Claims, 3 Drawing Sheets

PORTABLE TELEPHONE

FIELD OF THE INVENTION

The present invention relates to portable telephones having an automatic power-on function to have the power turned on at a predetermined activation time.

BACKGROUND OF THE INVENTION

With a portable telephone in general, a power key serving as one of manual keys is mounted thereon to be manipulated when the power is turned on/off. If the power key, for example, is depressed for longer than a specified period of time, the power can be switched from on to off or from off to on alternately. Widely used are portable telephones having an automatic power-on function for turning the power from off to on automatically upon a predetermined activation time coming. Among the portable telephones, such portable telephones are in wide use as have an alarm function to ring an alarm at a predetermined activation time.

With the portable telephones having the automatic power-on function and the alarm function, if the user sets one or a plurality of desired alarm producing times, whenever the desired time comes, the automatic power-on function is activated to have the power turned automatically off to on, and to activate the alarm function to ring an alarm, enabling the user to notice the activation time coming by sound, hence a convenience.

Under a certain circumstance into which portable telephones are brought, such as boarding an airplane or getting on the public transportation system, and the like, the user is required to turn off the power of the portable telephones due to the requirement of safety, etc. However, with the portable telephone having the automatic power-on function and the alarm function as stated above, even though the user turns the power off when boarding a plane, for instance, the power is automatically turned on to ring an alarm upon the alarm producing time coming.

In order to obviate this problem, the user needs to cancel the setting of the automatic power-on function and the alarm. In the case where the alarm is set at a plurality of times, the user must manipulate the cancellation of each alarm set time, bothering the user. Once the alarm set time is cancelled, the user must manipulate to set the alarm again, hence a cumbersomeness.

SUMMARY OF THE INVENTION

An object of the present invention is to provide a portable telephone which enables the user to cancel an automatic power-on function by a simple procedure even if an alarm is set at a plurality of times, and thereafter to have the setting of the automatic power-on function returned to the original state by a simple procedure.

The portable telephone of the invention comprises key input means, activation time memory means for storing an activation time being input by the manipulation of the key input means, activation time detection means for detecting whether the activation time comes which is stored in the activation time memory means, validation/invalidation memory means for storing validation/invalidation of the automatic power-on function set being input by the manipulation of the key input means, control means for activating the automatic power-on function upon detecting the activation time coming only when the validation of the automatic power-on function set is stored in the validation/invalidation memory means.

With the specific portable telephone of the invention described above, in the case where the user sets the automatic power-on function, the user inputs the invalidation of the automatic power-on function set by manipulating the key input means when boarding a plane, for example. This does not bring the automatic power-on function into being activated even upon a predetermined automatic power-on time coming. Thereafter, if the user inputs the validation of the automatic power-on function set by manipulating the key input means when getting off a plane, the automatic power-on function is activated, turning on the power automatically upon the predetermined activation time (power-on time) coming.

With the specific construction, the portable telephone comprises alarm means for ringing at a predetermined activation time. The control means activates the automatic power-on function and the alarm means upon detecting the activation time coming only when the validation of the automatic power-on function set is stored in the validation/invalidation memory means.

According to this specific construction, in the case where an alarm is set at a predetermined time, the user inputs the invalidation of the automatic power-on function set by manipulating the key input means when boarding a plane, for instance. This does not bring the automatic power-on function into being activated, not to ring an alarm even upon an alarm producing time coming. Thereafter, the user inputs the validation of the automatic power-on function set by manipulating the key input means when getting off a plane, activating the automatic power-on function to have the power turned on automatically upon the predetermined activation time (alarm producing time) coming, ringing the alarm at the same time.

Stated more specifically, the key input means comprises a power key to be manipulated when the power is turned off manually, and a function key to be manipulated when a desired function is set. The user inputs the validation of the automatic power-on function set by manipulating the power key without manipulating the function key. The user inputs the invalidation of the automatic power-on function set by manipulating the power key immediately after manipulating the function key. With the specific construction, when the power is turned off by the manipulation of the power key, validation/invalidation of the automatic power-on function set can be switched depending on whether the function key is manipulated.

Further specifically, the portable telephone of the invention comprises display means for displaying the state when the user inputs the invalidation of the automatic power-on function set with the power off state. With the specific construction, when the user inputs the invalidation of the automatic power-on function set, the display means shows the state of the invalidation. This leads to reduced likelihood that the user will forget the manipulation of returning the invalidation to the validation of the automatic power-on function set after getting off a plane, for example.

With the portable telephone of the invention described above, the setting of the automatic power-on function can be cancelled by the simple key manipulation even if alarm is set at a plurality of times, so that it is unnecessary for the user to cancel each alarm set time. Further, with the simple key manipulation, the setting of the automatic power-on function can be returned to the original state, and the user needs not conduct the manipulation again for setting an alarm.

DETAILED DESCRIPTION OF EMBODIMENTS

Figure 1:
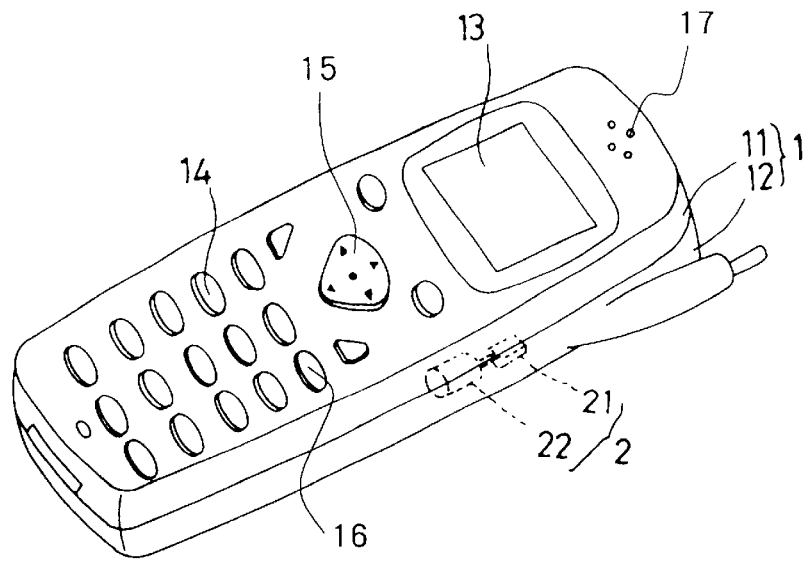
FIG. 1 is a perspective view showing the appearance of the portable telephone embodying the invention.

A detail description will be given below embodying the invention with reference to the drawings. As shown in FIG. 1, a portable telephone of the invention comprises a flat casing 1 having a front case 11 and a rear case 12. The front case 11 has a surface provided with a display 13, a speaker 17 for producing an incoming call notifying sound and a voice of incoming speech, and a plurality of manual keys 14 including a seesaw key 15 for selecting a function and a power key 16, etc. Installed inside the casing 1 are a circuit board (not shown) provided with an electronic circuit for realizing radio communication and other functions and a vibrator 2 for notifying the user of incoming calls having an eccentric weight 21 attached to an output shaft of a motor 22.

Figure 2:
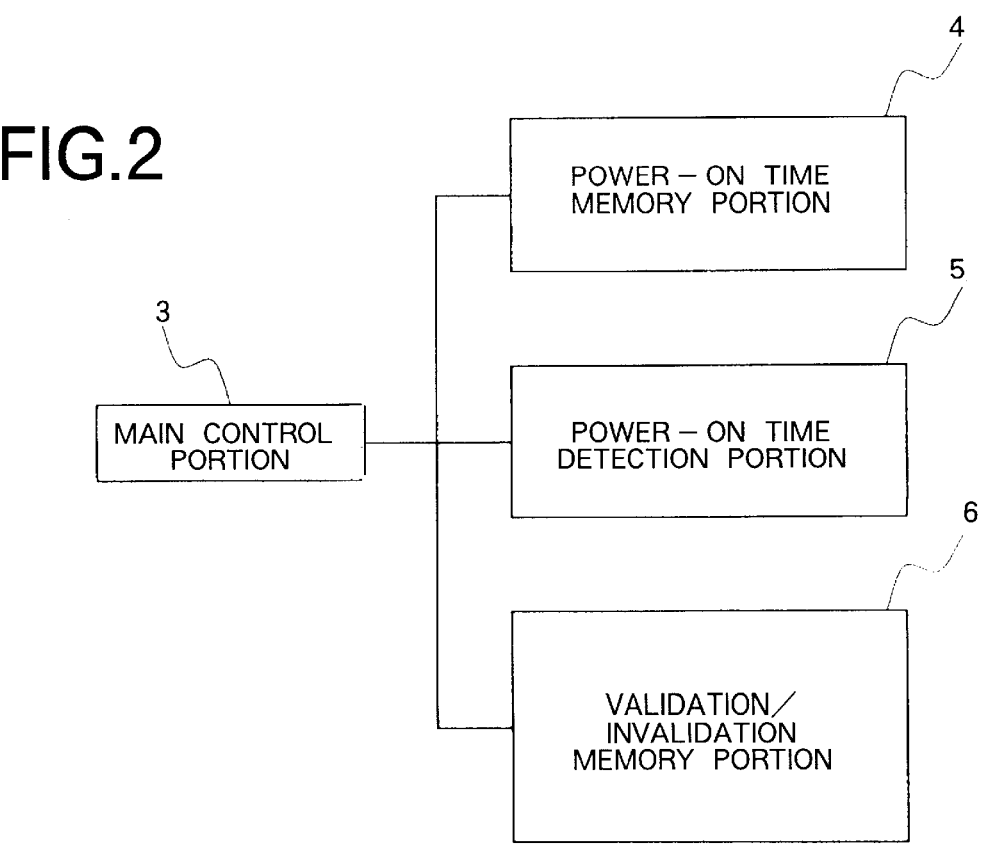
FIG. 2 is a block diagram showing function constitution of the portable telephone embodying the invention.

The portable telephone of the invention has an automatic power-on function for turning on the power at a predetermined activation time (power on time) and an alarm function for producing an alarm sound from a speaker 17 at a predetermined activation time (alarm producing time). In order to realize these functions, the circuit board is, as shown in FIG. 2, provided with a main control portion 3, a power-on time memory portion 4, a power-on time detection portion 5, and a validation/invalidation memory portion 6 for storing validation/invalidation of automatic power-on function set.

A specified key manipulation sets the automatic power-on function, and then the power-on time being input by the key manipulation is stored in the power-on time memory portion 4. The alarm is set for a plurality of times by a specified key manipulation, and a plurality of alarm producing times being input by the key manipulation are stored in the power-on time memory portion 4.

A power-on time detection portion 5 detects whether an activation time (power-on time, alarm-producing time) comes, being stored in the power-on time memory portion. When the activation time comes, the detection portion supplies a detection signal to the main control portion 3. The validation/invalidation memory portion 6 stores the validation/invalidation of the automatic power-on function set being input by a specified key manipulation described below.

Only when the validation of the automatic power-on function set is stored in the power-on time memory portion 4, the main control portion 3 activates the automatic power-on function upon detecting the power-on time or the alarm producing time. As a result, the power is automatically turned on, and an alarm sound is produced if the alarm is set.

Figure 3:
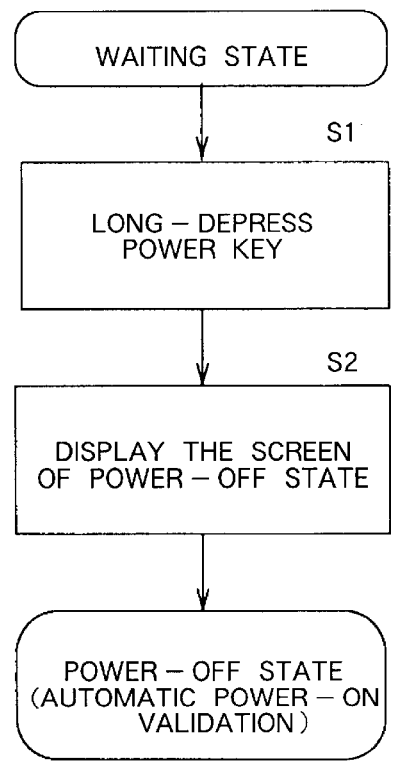
FIG. 3 is a flow chart showing the manipulation and the operation for setting validation of an automatic power-on function.

FIG. 3 shows the manipulation and the operation to have the setting of the automatic power-on function validated. From waiting state (power on state), the power key is depressed for longer than a specified period of time (long-depression) in step 1. In step 2 the display shows the power-off state, to set the power-off state (automatic power-on validation).

Figure 4:
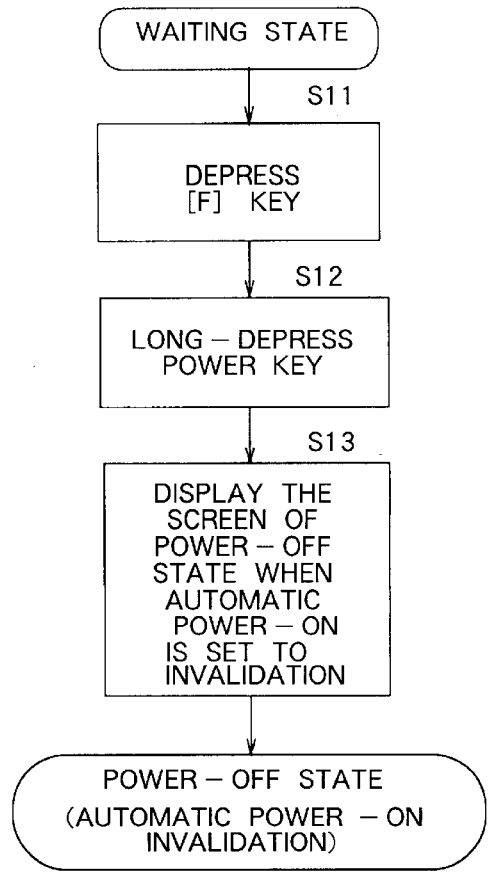
FIG. 4 is a flow chart showing the manipulation and the operation for setting invalidation of an automatic power-on function.

FIG. 4 shows the manipulation and the operation for having the setting of the automatic power-on function invalidated. From waiting state (power on state), a function key ([F] key) is depressed in step 11, and step 12 follows to have the power key depressed for longer than a specified period of time (long-depression). In step 13 the display shows the power-off state when the automatic power-on is set to invalidation, to set the power-off state (automatic power-on invalidation).

Figure 5:
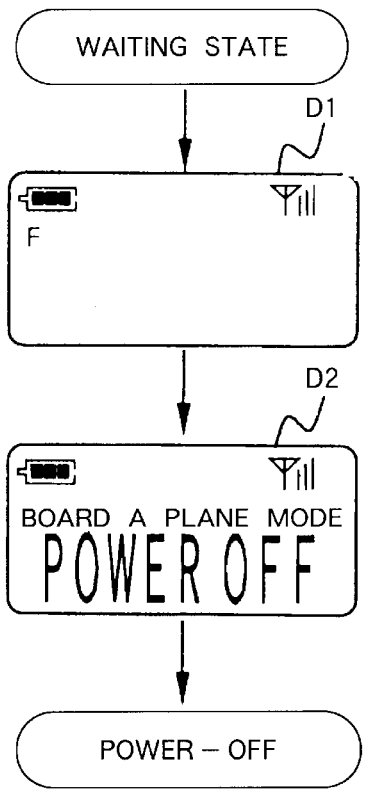
FIG. 5 is a flow chart showing how the display of the screen is changed over on the process of setting invalidation of the automatic power-on function.

FIG. 5 shows how the screen of the display is changed over on the process of the manipulation of setting the automatic power on function to invalidation. As described above, from waiting state, the function key is depressed, to have the letter "F" shown on a corner of a screen (D1). Further, the power key is long-depressed, to have the power off state screen (D2) on the automatic power on invalidation set displayed, and thereafter the power is turned off. This screen (D2) enables the user to notice that the automatic power-on function is set to invalidation.

Figure 6:
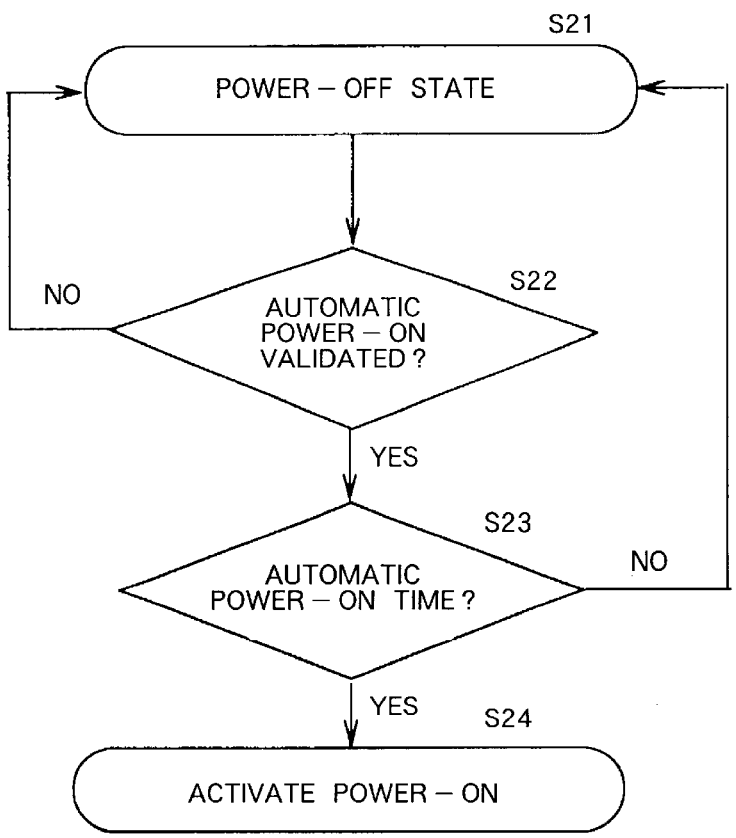
FIG. 6 is a flow chart of the automatic power-on operation.

FIG. 6 shows the operation of the main control portion 3 on the power-off state. From the power off state in step S21, step S22 follows to refer to the validation/invalidation memory portion 6, to inquire whether the automatic power-on function set is validated. If the answer is negative, that is, the power is off when the automatic power-on is set to invalidation, the step S21 follows again to maintain the power off state. Accordingly, even though the automatic power-on time or the alarm producing time comes, the power is not turned on, nor is the alarm sound produced.

On the other hand, if the answer is affirmative in step S22, that is, the power is off when the automatic power-on is set to validation, step S23 follows to inquire whether it is the automatic power-on time. If the answer is negative, step S21 follows again to maintain the power off state. Thereafter, when the automatic power-on time (alarm producing time) comes and the answer for step S23 is affirmative, step S24 follows to have the power turned on. As a result, the alarm sound is produced, to notify the user of the predetermined time coming.

As described above, the portable telephone of the invention enables the user to set the automatic power-on function to invalidation by the simple manipulation of long-depressing the power key after depressing the function key. Thereafter, the power is turned on temporarily by the manipulation of long-depressing the power key, and then the automatic power-on function can be set to validation by the simple manipulation of long-depressing the power key without the manipulation of the function key.

The device of the present invention is not limited to the foregoing embodiment in construction but can be modified variously by one skilled in the art without departing from the spirit of the invention as set forth in the appended claims. The automatic power-on function, for example, can be set to validation/invalidation not only by the system of using the function key and the power key, but also by other manipulations of various keys.

What is claimed is:

1. A portable telephone having an automatic power-on function to have the power turned on automatically at a predetermined activation time, the portable telephone comprising:

key input means, activation time memory means for storing an activation time being input by the manipulation of the key input means, activation time detection means for detecting whether the activation time being stored in the activation time memory means comes, validation/invalidation memory means for storing validation/invalidation of automatic power-on function set being input by the manipulation of the key input means, control means for activating the automatic power-on function upon detecting the activation time coming only when the validation of the automatic power-on function set is stored in the validation/invalidation memory means.

2. A portable telephone according to claim 1 wherein the telephone comprises alarm means for ringing an alarm at a predetermined activation time, the control means activates the automatic power-on function and the alarm means upon detecting the activation time coming only when the validation of the automatic power-on function set is stored in the validation/invalidation memory means.

3. A portable telephone according to claim 1 wherein the key input means comprises a power key to be manipulated when the power is turned off manually, and a function key to be manipulated when the user sets a desired function, the validation of the automatic power-on function set is input by the manipulation of the power key without the manipulation of the function key, and the invalidation of the automatic power-on function set is input by the manipulation of the power key immediately after the manipulation of the function key.

4. A portable telephone according to claim 1 wherein the telephone comprises display means for showing the state when the invalidation of the automatic power-on function set is input with the power off.

* * * * *